(12) United States Patent
Hsu

(10) Patent No.: US 7,168,426 B1
(45) Date of Patent: Jan. 30, 2007

(54) PORTABLE GAS STOVE ASSEMBLY

(76) Inventor: Huang-Hsi Hsu, 8F., No. 14, Lane 252, Chungshan N. Rd., Sec. 6, Taipei (TW)

( * ) Notice: Subject to any disclaimer, the term of this patent is extended or adjusted under 35 U.S.C. 154(b) by 0 days.

(21) Appl. No.: 11/184,907

(22) Filed: Jul. 20, 2005

(51) Int. Cl.
*F24C 3/08* (2006.01)
*F24C 3/00* (2006.01)

(52) U.S. Cl. ............... 126/40; 126/39 R; 126/256; 126/260; 431/344

(58) Field of Classification Search ............... 431/344; 126/38, 40, 248–256, 39 R, 260
See application file for complete search history.

(56) References Cited

U.S. PATENT DOCUMENTS

| | | | |
|---|---|---|---|
| 7,474 A * | 7/1850 | Jackson | |
| 28,761 A * | 6/1860 | McGlensey | 126/40 |
| 302,015 A * | 7/1884 | Musgrave | 126/40 |
| 617,200 A * | 1/1899 | Strauss | 126/253 |
| 709,493 A * | 1/1902 | Lawler | 126/40 |
| 845,297 A * | 2/1907 | Foley | 126/253 |
| 1,822,356 A * | 9/1931 | McCartney et al. | 431/203 |
| 2,354,221 A * | 7/1944 | Robinson | 126/38 |
| 2,397,766 A * | 4/1946 | Boyd | 126/38 |
| 2,448,326 A * | 8/1948 | Roberts | 126/258 |
| 2,465,572 A * | 3/1949 | Bramming | 431/344 |
| 2,538,538 A * | 1/1951 | Stempel et al. | 126/38 |
| 2,954,024 A * | 9/1960 | Webster | 126/38 |
| 3,156,379 A * | 11/1964 | Corlet | 431/344 |
| 4,653,462 A * | 3/1987 | DeFoe | 126/24 |

* cited by examiner

*Primary Examiner*—Carl D. Price
(74) *Attorney, Agent, or Firm*—Bacon & Thomas, PLLC

(57) ABSTRACT

A portable gas stove assembly includes a gas stove and a stove stand, wherein the gas stove has a fuel tank for storing fuel, a flow regulating valve for regulating the flow of the fuel, a fuel nozzle for guiding the fuel flowing from the flow regulating valve, a burner at the top of the fuel nozzle, an adjusting rod on one side of the flow regulating valve for controlling the fuel passing through the flow regulating valve and a first connecting device proximate to the burner; and the stove stand includes a placing section for placing a cooking utensil and a second connecting device disposed on the placing section corresponding to the first connecting device for integrally coupling the stove stand with the first connecting device.

2 Claims, 4 Drawing Sheets

PORTABLE GAS STOVE ASSEMBLY

FIELD OF THE INVENTION

The present invention generally relates to gas stoves, and more particularly to a portable gas stove assembly that provides a stable and secured stove even when the stove is set on a rough ground.

BACKGROUND OF THE INVENTION

In recent years, competition has become more severe, and thus the pace of our life and work have become faster. Whenever there is a holiday, people often take their families and invite their friends for outdoor activities such as hiking or camping to release pressure from their life and work. Therefore, various different outdoor activity appliances are introduced.

Among various different outdoor appliances, a portable gas stove for boiling water for tea or coffee is the most popular appliance, since the stove is convenient to carry and easy to use. Consumers usually carry this kind of stove with them for outdoor activities, so that they can make tea or coffee on the spot, which provides drinks for the participants and gives more fun to the activity.

A common portable gas stove set is described as follows:

Referring to FIG. 1, the gas stove assembly comprises a gas stove 10 and a stove stand 16, wherein the gas stove 10 comprises: a fuel tank 11 for storing fuel such as fuel gas, oil gas or other liquefied fuel; a flow regulating valve (not shown in the figure) disposed on the fuel tank 11; a fuel nozzle (not shown in the figure) disposed at the top of the flow regulating valve, a heat insulting lid 12 for covering the flow regulating valve and fuel nozzle; an opening 121 disposed at the top of the heat insulating lid 12 such that the opening 121 allows a burner 13 to be installed at the top of the fuel nozzle, and the burner 13 is exposed on the top of the opening 121; an adjusting rod 14 disposed on one side of the flow regulating valve; a knob 15 disposed at the outside of an end of the adjusting rod 14 for turning the adjusting rod 14 to control the fuel flowing from the flow regulating valve to the burner 13.

The stove stand 16 comprises: a placing section 161 for containing cooking utensils such as a tea pot or a coffee pot; a plurality of support stands 162 extended downward from the periphery of the placing section 161 for securely supporting the stove stand 16, and the space formed between the placing section 161 and the support stands 162 precisely accommodates the gas stove 10, and the burner 13 of the gas stove 10 is disposed at a position corresponding to the placing section 161, such that the foregoing gas stove assembly allows users to cook by the utensils placed on the placing section 161, when a user lights up the fuel coming out from the burner 13.

However, the size of the stove stand is very large and occupies much space and is inconvenient to carry during the use of the gas stove. If the ground for supporting the stove is rugged and rough, one of the support stands 162 will be lifted and shaky, and the stove stand 16 is not secured or stable on the ground. Therefore, the utensils placed on the placing section 161 are not secured and will topple over and will cause accidents easily. Since the supporting surface of the stove stand 16 is not even, the relative heights of the placing section 161 and the burner 13 will be affected, and the burning position of the utensil will be uneven. As a result, the burning efficiency is lowered, which is a problem for users to cook or boil water.

In summation of the description above, the quality of the gas stoves produced nowadays are almost the same, and the features of improving the foregoing shortcomings becomes an advantage for manufacturers to gain market share. Therefore, it is an important subject for manufacturers to design a more practical stove assembly so as to improve the competitiveness of the products of this sort.

SUMMARY OF THE INVENTION

In view of the prior art gas stove, the gas stove and the stove stand are two separate parts, and thus the structural relation of the stove stand causes inconvenience for users to carry, and even causes the utensils placed on the placing section unstable and easy to topple over or cause accidents if the ground is rough. It also will cause an uneven burning due to the positions of the burner and the utensil, and thus affecting the burning performance.

To effectively solve the existing problems and meet the actual market and user requirements, the inventor, based on years of experience and conducting extensive research and experiments, has designed a portable gas stove assembly. Therefore, it is a primary objective of the present invention to effectively overcome the foregoing shortcomings by providing a portable gas stove assembly that includes a gas stove and a stove stand, wherein the gas stove comprises a fuel tank for storing fuel, a flow regulating valve disposed at the top of the fuel tank for regulating the fuel flowed out from the fuel tank, a fuel nozzle disposed at the top of the flow regulating valve for guiding out the fuel from the flow regulating valve, a burner installed at the top edge of the fuel nozzle, an adjusting rod disposed on one side of the flow regulating valve for controlling the flow of fuel passing through the flow regulating valve, a knob disposed on another end of the flowing regulating valve for turning the adjusting rod to control the fuel of the fuel tank passing through the flow regulating valve and the fuel nozzle to the burner; a first connecting device disposed proximate to the burner. The stove stand comprises a placing section for placing a cooking utensil and a second connecting device disposed on the placing section corresponding to the first connecting device for integrally coupling the stove stand with the first connecting device.

The first connecting device is a circular ring structure with a thread disposed externally around, and the second connecting device is a hollow circular ring structure with a thread disposed internally around. The first and second connecting devices could be of different structural designs, such as the first connecting device being a circular ring structure with an embedded member or an embedded groove disposed externally around and the second connecting device is a hollow circular ring structure with an embedded groove or an embedded member disposed internally around, and the placing section of the stove stand is a hollow disc stand comprised of a plurality of racks.

The above and other objects, features and advantages of the present invention will become apparent from the following detailed description taken with the accompanying drawings.

DETAILED DESCRIPTION OF THE PREFERRED EMBODIMENTS

Figure 1:
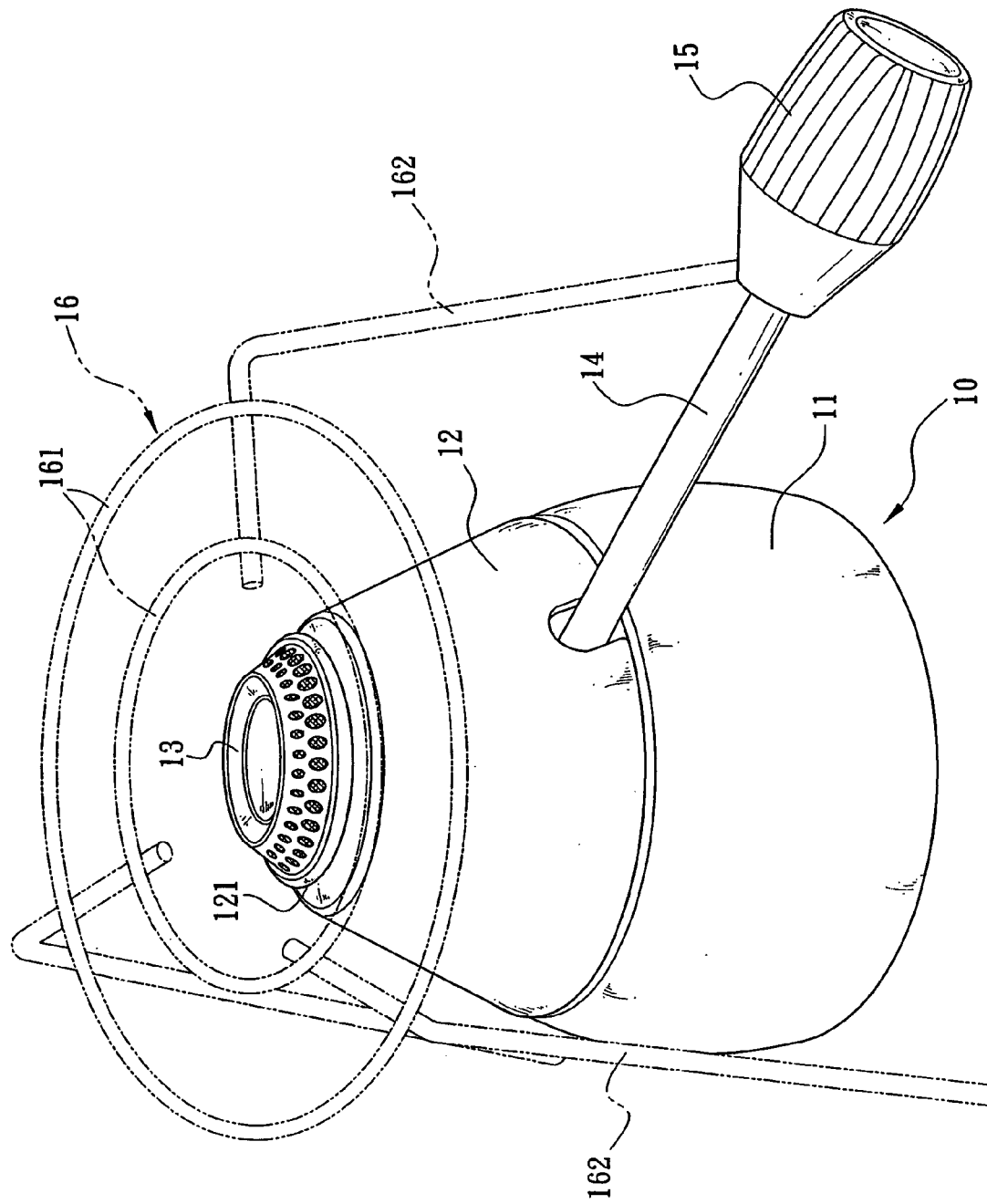
FIG. 1 is a perspective view of a prior art portable gas stove assembly.
Figure 2:
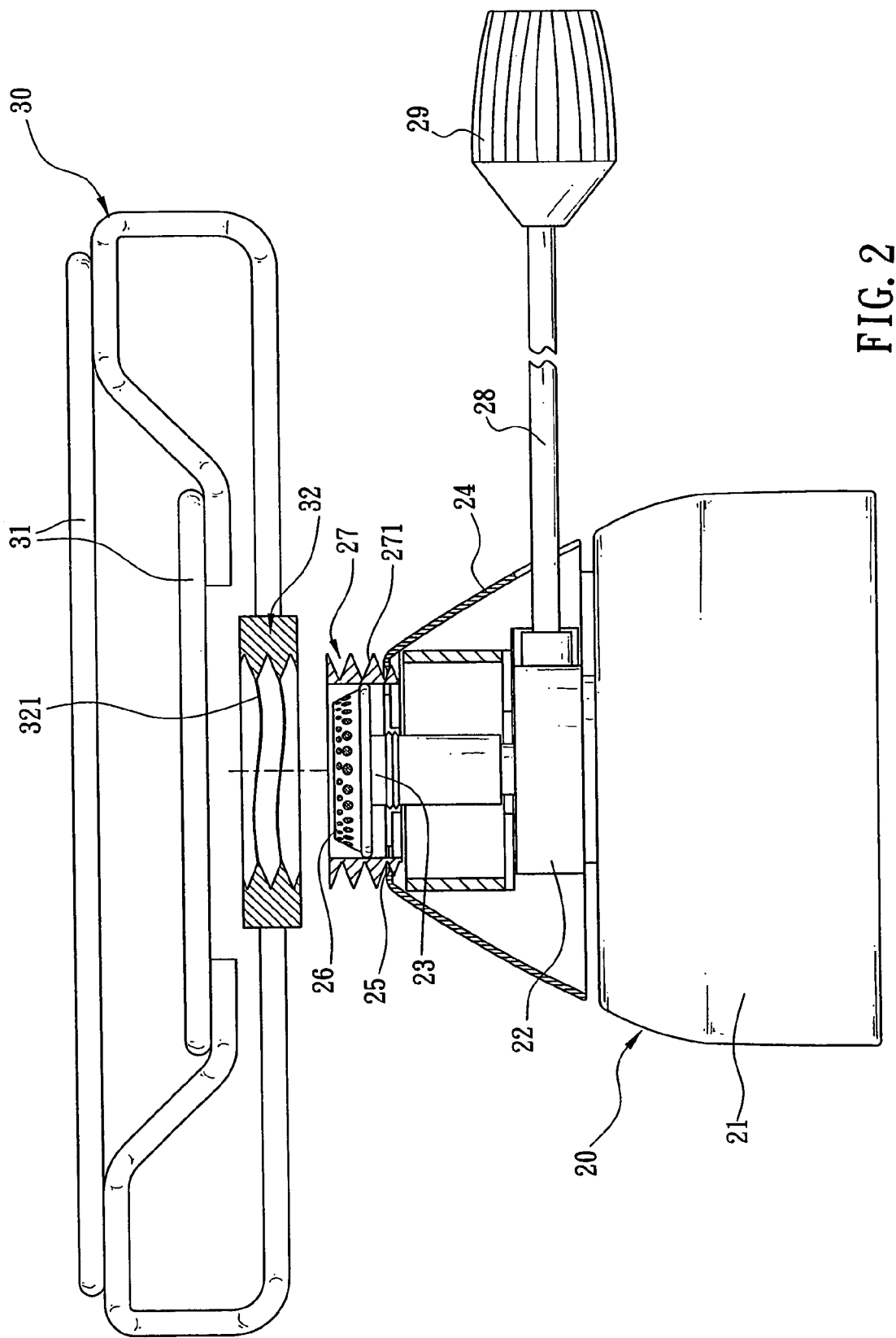
FIG. 2 is a schematic view of a preferred embodiment of the invention.

Referring to FIG. 2 for a portable gas stove assembly of a preferred embodiment of the present invention, the portable gas stove assembly comprises a gas stove 20 and a stove stand 30, wherein the gas stove 20 comprises a fuel tank 21 for storing fuel such as gas, oil gas, or liquefied fuels, a flow regulating valve 22 disposed at the top of the fuel tank 21 for adjusting the fuel flowing out from the fuel tank 21, a fuel nozzle 23 disposed at the top of the flow regulating valve 22 for guiding the fuel to pass through the flow regulating valve 22, a heat insulating lid 24 for covering the flow regulating valve 22 and the fuel nozzle 23; an opening 25 disposed at the upper edge of the heat insulating lid 24, such that the opening 25 allows a burner 26 to be installed at the top of the fuel nozzle 23, and exposes the burner 26 from the upper edge of the opening 25, a first connecting device 27 disposed at a neck section of the opening 25 for connecting an external object, an adjusting rod 28 disposed on a side of the flow regulating valve 22 for controlling the flow of the fuel from the flow regulating valve 22, a knob 29 disposed at an end of the adjusting rod 28 for turning the adjusting rod 28 to control the fuel of fuel tank 21 passing through the flow regulating valve 22 and the fuel nozzle 23 to the burner 26.

Figure 3:
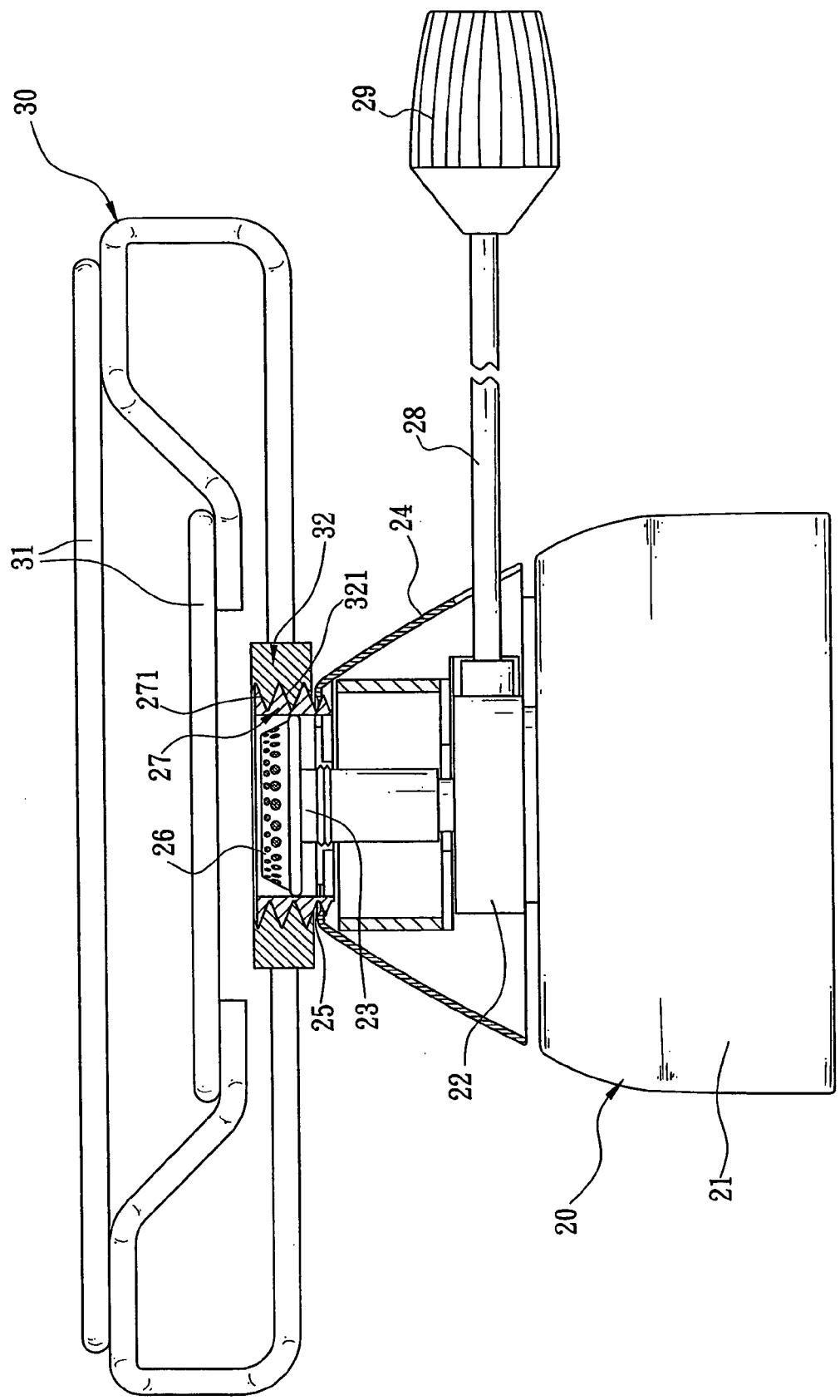
FIG. 3 is a schematic view of the assembly as depicted in FIG. 2.

Referring to FIG. 2 for the preferred embodiment again, the stove stand 30 includes a placing section 31 for placing the cooking utensil such as a tea pot or a coffee pot, a second connecting device 32 disposed on the placing section 31 corresponding to the first connecting device 27 disposed at the neck section of the opening 25, such that the stove stand 30 is integrally coupled to the second connecting device 32 by the connecting device 27 to form the portable gas stove assembly. Referring to FIG. 3, a user is ready to use the gas stove 20 by lighting up the fuel coming out from the burner 26 by an igniter (not shown in the figure), so as to quickly and successfully heat up the cooking utensil (not shown in the figure) placed on the placing section 31.

With the foregoing components, it is clear that the design of integrally coupling the first connecting device 27 disposed at the neck section of the opening 25 with the second connecting device 32 disposed at the stove stand 30 not only keeps a specific distance between the cooking utensil on the placing section 31 from the burner to prevent uneven burning and avoid an adverse influence to the cooking performance, but also gives a better condition for the stove stand 30 without being restricted by uneven supporting surfaces. As long as there is a placing surface on the gas stove 20, the gas stove 20 can be coupled integrally with the stove stand 30 by the first connecting device 27 and the second connecting device 32 for a stable application. Further, the present invention also can overcome the shortcomings of the oversize of the stove stand 30 that occupies much space and is inconvenient to carry.

Referring to FIG. 2 for the preferred embodiment again, the first connecting device 27 at the neck section of the opening 25 may have a different structural design from that of the second connecting device 32 of the placing section 31, provided that the two connecting devices 27, 32 are corresponding to each other. In FIG. 2, the first connecting device 27 is a circular ring structure with a thread 271 disposed externally around, and the second connecting device 32 is a hollow circular structure with a thread 321 disposed internally around. Therefore, the first connecting device 27 and the second connecting device 32 are connected with each other by their threads 271, 321 so as to integrally connect the connecting devices 27, 32, such that the stove stand 30 can be secured with the gas stove 20.

Referring to FIG. 2 again, the placing section 31 of the stove stand 30 is a hollow disc stand comprised of a plurality of racks. However, the shape and characteristics of the stove stand 30 is not limited to a disc stand, and various modifications and similar arrangements should be accorded the broadest interpretation so as to encompass all such modifications and similar arrangements and procedures.

Figure 4:
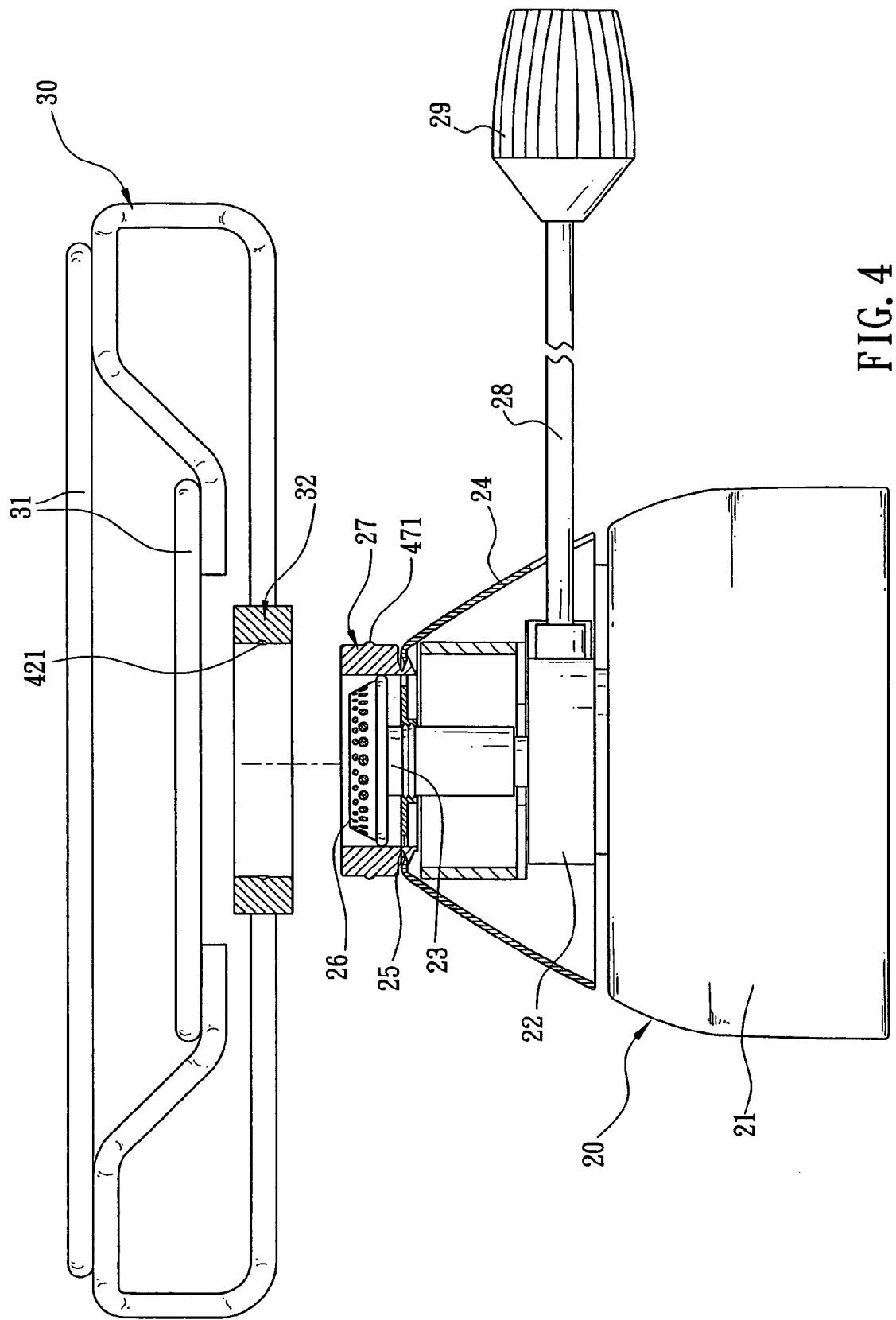
FIG. 4 is a schematic view of another preferred embodiment of a first connecting device and a second connecting device.

Referring to FIG. 4 for another preferred embodiment of the connecting device 27 disposed at the neck section of the opening 25 and the second connecting device 32 of the placing section 31, the first connecting device 27 has a structural design of a circular ring with an embedded member 471 or an embedded groove disposed externally around, and the second connecting device 32 of the placing section 31 has a structural design of a hollow circular ring with an embedded groove 421 or embedded member, so that the first connecting device 27 and the second connecting device 32 are securely and integrally coupled with each other by the embedded member 471 and the embedded groove 421, and the stove stand 30 is secured onto the gas stove 20.

While the invention has been described by means of specific embodiments, numerous modifications and variations could be made thereto by those skilled in the art without departing from the scope and spirit of the invention set forth in the claims.

What is claimed is:

1. A portable gas stove assembly, comprising:
   a gas stove, including a fuel tank for storing a liquefied fuel;
   a flow regulating valve, disposed at a top of said fuel tank for regulating the fuel flow of said fuel tank;
   a fuel nozzle, disposed at a top of said flow regulating valve for guiding out the fuel passing through said flow regulating valve;
   a burner, installed at a top edge of said fuel nozzle;
   an adjusting rod, having a first end disposed at a side of said flow regulating valve for controlling the flow of fuel passing through said flow regulating valve and a second end including a knob for turning said adjusting rod to control the fuel of said fuel tank to pass through said flow regulating valve and said fuel nozzle to said burner;
   a first connecting device, being disposed proximate to said burner;
   a stove stand, including a placing section for placing a cooking utensil and a second connecting device disposed on the placing section at a location corresponding to the first connecting device, such that said stove stand is coupled with said first connecting device by said second connecting device;
   wherein said flow regulating valve and said fuel nozzle located below and covered by a heat insulating lid, and said heat insulating lid includes an opening at a top edge and said burner is connected to the nozzle through the opening and located above said top edge of the opening defining a neck section of sad opening;
   wherein said first connecting device is connected to the neck section of said opening;
   wherein said first connecting device is a circular ring structure having a thread disposed around an exterior surface thereof; and
   wherein said second connecting device is a hollow circular ring having a thread disposed around an interior surface thereof.

2. The portable gas stove assembly of claim 1, wherein said placing section of said stove stand is a stand comprised of a plurality of racks.

* * * * *